(12) United States Patent
Fukumine et al.

(10) Patent No.: US 8,802,289 B2
(45) Date of Patent: Aug. 12, 2014

(54) COMPOSITION FOR ELECTRODE COMPRISING AN IRON COMPOUND WITH CARBON AND A (METH)ACRYLATE-NITRILE COPOLYMER

(75) Inventors: Mayumi Fukumine, Tokyo (JP); Mitsuhiro Mori, Tokyo (JP); Masahiro Yamakawa, Tokyo (JP); Hidekazu Mori, Tokyo (JP)

(73) Assignee: Zeon Corporation, Tokyo (JP)

( * ) Notice: Subject to any disclaimer, the term of this patent is extended or adjusted under 35 U.S.C. 154(b) by 1763 days.

(21) Appl. No.: 11/664,880

(22) PCT Filed: Oct. 5, 2005

(86) PCT No.: PCT/JP2005/018441
§ 371 (c)(1),
(2), (4) Date: Jul. 17, 2007

(87) PCT Pub. No.: WO2006/038652
PCT Pub. Date: Apr. 13, 2006

(65) Prior Publication Data
US 2008/0096109 A1    Apr. 24, 2008

(30) Foreign Application Priority Data

Oct. 6, 2004   (JP) ................................ 2004-294012
Oct. 6, 2004   (JP) ................................ 2004-294067

(51) Int. Cl.
| | | |
|---|---|---|
| H01M 4/60 | (2006.01) | |
| H01M 4/13 | (2010.01) | |
| H01M 4/136 | (2010.01) | |
| H01M 4/58 | (2010.01) | |
| H01M 4/04 | (2006.01) | |
| H01M 4/1397 | (2010.01) | |
| H01M 4/62 | (2006.01) | |
| H01M 10/052 | (2010.01) | |
| H01M 4/36 | (2006.01) | |
| H01M 10/054 | (2010.01) | |

(52) U.S. Cl.
CPC ............ *H01M 10/052* (2013.01); *H01M 4/136* (2013.01); *H01M 4/5825* (2013.01); *H01M 4/0404* (2013.01); *H01M 4/1397* (2013.01); *H01M 4/622* (2013.01); *H01M 10/054* (2013.01); *Y02E 60/122* (2013.01); *H01M 4/364* (2013.01); *Y02T 10/7011* (2013.01)

USPC .......... 429/212; 429/209; 429/213; 429/215; 429/221; 252/182.1

(58) Field of Classification Search
None
See application file for complete search history.

(56) References Cited

U.S. PATENT DOCUMENTS

| 5,595,841 | A | 1/1997 | Suzuki | |
|---|---|---|---|---|
| 2002/0041998 | A1 | 4/2002 | Hosoya et al. | |
| 2006/0251966 | A1* | 11/2006 | Yamakawa et al. | ........... 429/217 |

FOREIGN PATENT DOCUMENTS

| CN | 1349264 A | 5/2002 |
|---|---|---|
| JP | 8-287915 A | 11/1996 |
| JP | 2003-36889 A | 2/2003 |
| JP | 2003-292309 A | 10/2003 |
| JP | 2003-317722 A | 11/2003 |
| JP | 2004-227974 A | 8/2004 |

OTHER PUBLICATIONS

Machine translation of JP 2003-036889, Kanzaki et al., May 15, 2002.*
Machine translation of JP 08-287915, Suzuki Ryuta, Nov. 1, 1996.*
Partial English translation of JP-2003-36889-A dated Feb. 7, 2003.
Partial English translation of JP-2003-292309-A dated Oct. 15, 2003.
English abstract of JP-8-287915-A dated Nov. 1, 1996.
Partial English translation of JP-2003-317722-A dated Nov. 7, 2003.
Partial English translation of JP-2004-227974-A dated Aug. 12, 2004.

* cited by examiner

*Primary Examiner* — Kwang Han
(74) *Attorney, Agent, or Firm* — Birch, Stewart, Kolasch & Birch, LLP

(57) ABSTRACT

Disclosed is a composition for electrode comprising (i) a positive electrode active material comprising an iron compound and carbon, and (ii) a copolymer (P) prepared by copolymerization of acrylic acid esters and/or methacrylic acid esters, with an $\alpha,\beta$-unsaturated nitrile compound. Also disclosed is an electrode comprised of an active material layer made of the composition for electrode, and a collector. This electrode can be produced by mixing the positive electrode active material, the copolymer (P), a solvent and an optional thickener, by a mixer to prepare an electrode composition slurry with solid content of 40-90% by weight, coating a collector with the electrode composition slurry, and then, removing the solvent from the thus-formed coating. Further disclosed a battery provided with the electrode.

13 Claims, No Drawings

COMPOSITION FOR ELECTRODE COMPRISING AN IRON COMPOUND WITH CARBON AND A (METH)ACRYLATE-NITRILE COPOLYMER

TECHNICAL FIELD

This invention relates to a composition for electrode, an electrode and a battery. More particularly, it relates to a composition for electrode comprising a positive electrode active material comprising an iron compound and carbon, which composition is capable of giving a battery having a high capacity and a low internal resistance and exhibiting a minimized reduction in capacity when a charge-discharge cycle is repeated.

BACKGROUND ART

In recent years, portable electronic appliances such as notebook-sized personal computer, a cellular phone and a personal digital assistance have spread wide. As an electric source for these portable electronic appliances, a non-aqueous electrolyte secondary battery is widely used. Further, in recent years, a non-aqueous electrolyte secondary battery also attracts attention as a large size electric source for electric vehicles. The positive electrode of a non-aqueous electrolyte secondary battery is made by forming on a collector a layer composed of a composition comprising a positive electrode active material and a binder (which composition and active layer are referred to as "electrode composition" and "active material layer", respectively, in the present invention). As the positive electrode active material, $LiCoO_2$, $LiNiO_2$ and others are used. These positive electrode active materials are unstable at overcharge, and therefore, the use of an iron compound such as $LiFePO_4$ is examined for a battery of a large capacity for electric vehicles.

Iron compounds used for an electrode active material generally have low electrical conductivity, and therefore, an electrochemical reaction often does not occur with the result of an increase in the internal resistance and reduction in capacity. To provide an electrode active material having good electrical conductivity, a proposal has been made wherein a composite electrode active material having incorporated therein a carbon material having good electrical conductivity is used, or the electrode active material is coated with a carbon material having good electrical conductivity. Another proposal has been made wherein an electrode active material having a reduced particle diameter is used for increasing the surface area contributing an electrochemical reaction [see US 2002-195, 591 A1 (=JP 2001-15111 A) and JP 2003-36889 A].

However, the electrode active material having a reduced particle diameter leads to increase in the surface area with the results of an increase in the amount of binder used for binding electrode active material particles to each other and to a collector. The binder is electrically non-conductive and thus the use of a large amount of binder also leads to an increase in the internal resistance and reduction in capacity. To obtain an enhanced binding force with a small amount of binder, a proposal has been made which uses a synthetic rubber latex binder [US 2004-121232 A1 (=JP 2004-55493 A)]. The synthetic rubber latex binder includes, for example, styrene-butadiene rubber latex, nitrile-butadiene rubber latex and methyl methacrylate-butadiene rubber latex.

Even with these synthetic rubber latex binders, the electrical conductivity is not enhanced to the desired extent. Further, these rubber latex binders tend to be degraded at a high voltage exceeding 4.0 volt, and thus, the battery performance is deteriorated at overcharge, and the safety is reduced.

DISCLOSURE OF THE INVENTION

Problems to Be Solved by the Invention

The present invention is to provide an improvement for obviating the foregoing problems of the prior art, and thus, the object of the present invention is to provide a composition for electrode which is capable of giving a battery having a high capacity and a low internal resistance.

The present inventors made extensive researches and found that the above-mentioned object can be achieved by providing a composition for electrode comprising (i) a positive electrode active material comprising an iron compound and carbon, and (ii) a specific copolymer. The present invention has been completed based on this finding.

Means for Solving the Problems

In accordance with the present invention, there are provided (1) a composition for electrode, (2) an electrode, (3) a process for producing the electrode, and (4) a battery provided with the electrode, which are recited below.

(1) A composition for electrode comprising (i) a positive electrode active material comprising an iron compound and carbon, and (ii) a copolymer (P) prepared by copolymerization of a monomer mixture comprising at least one monomer selected from acrylic acid esters and methacrylic acid esters, and an α,β-unsaturated nitrile compound.

The above-mentioned iron compound is preferably an alkali metal-containing iron composite oxide (B) represented by the following general formula:

$$A_yFeXO_4$$

where A is an alkali metal, X is at least one element selected from the elements of groups 4 to 7 and groups 14 to 17 of the Periodic Table, and y is a number of 0<y<2. The alkali metal-containing iron composite oxide (B) preferably has an olivine structure with a close-packed hexagonal oxygen lattice. The above-mentioned composition for electrode can further comprise (iii) a solvent, or comprise (iii) a solvent and (iv) a thickener.

(2) An electrode comprised of an active material layer and a collector, wherein said active material layer comprises (i) a positive electrode active material comprising an iron compound and carbon, and (ii) a copolymer (P) prepared by copolymerization of a monomer mixture comprising at least one monomer selected from acrylic acid esters and methacrylic acid esters, and an α,β-unsaturated nitrile compound.

(3) A process for producing an electrode comprising the steps of:

coating a collector with a composition for electrode, which comprises (i) a positive electrode active material comprising an iron compound and carbon, (ii) a copolymer (P) prepared by copolymerization of a monomer mixture comprising at least one monomer selected from acrylic acid esters and methacrylic acid esters, and an α,β-unsaturated nitrile compound, and (iii) a solvent; and then removing the solvent from the thus-formed coating.

The electrode composition used may further comprise (iv) a thickener. Preferably, the composition for electrode used for coating on the collector is a slurry having a solid content of 40 to 90% by weight, which is prepared by mixing together the positive electrode active material, the copolymer (P) and the solvent, or, the positive electrode active material, the copolymer (P), the solvent and a thickener, by using a mixer. The mixer used is preferably a media-mill dispersion mixer.

(4) A battery provided with the electrode mentioned above in (2).

Effect of the Invention

An electrode made from the composition for electrode according to the present invention has improved binding force and flexibility, and therefore, the electrode gives a battery having a high capacity and good repeated charge-discharge cycle characteristics, and having a low internal resistance and being capable of being rapidly charged and discharged and further having enhanced safety.

BEST MODE FOR CARRYING OUT THE INVENTION

The composition for electrode according to the present invention comprises a positive electrode active material comprising an iron compound and carbon. This positive electrode active material is preferably a composite of an iron compound with carbon.

The iron compound used is not particularly limited, provided that it is capable of reversibly inserting and eliminating an lithium ion. A preferable example of the iron compound is an alkali metal-containing iron composite oxide (B) represented by the following general formula:

$$A_y FeXO_4$$

This formula is a rational formula, and A represents an alkali metal such as lithium, sodium and potassium. Of these, lithium is preferable. X represents at least one element selected from the elements of groups 4 to 7 and groups 14 to 17 of the Periodic Table, and y is a number of $0<y<2$.

The above-mentioned iron composite oxide (B) usually has a structure such that element X is located at tetrahedron site and an alkali metal and iron are located at octahedron site. Thus the structure of the positive electrode active material can be expressed by the following formula:

$$\{X\} \cdot [A_y Fe] O_4$$

where { } represents a tetrahedron site and [ ] represents an octahedron site. Preferable examples of the element X capable of giving such structure include group 5 elements such as vanadium, and group 15 elements such as phosphorus, arsenic, antimony and bismuth.

The above-mentioned alkali metal-containing iron composite oxide (B) preferably has an olivine structure with a close-packed hexagonal oxygen lattice, or a spinel or reciprocal spinel structure with a close-packed cubic oxygen lattice. Of these, an olivine structure with a close-packed hexagonal oxygen lattice is especially preferable. The fundamental difference between the olivine structure and the spinel or reciprocal spinel structure lies in that the oxygen ion has a hexagonal close-packed structure in the former, whereas, the oxygen ion has a cubic close-packed structure in the latter. Each stable structure varies depending upon the kinds of elements A and X. For example, $LiFePO_4$ is stable when it has an olivine structure, whereas, $LiFeVO_4$ is stable when it has a reciprocal spinel structure.

The compound of formula $A_y FeXO_4$ with an olivine structure or a spinel structure can be prepared by a process wherein an alkali metal compound, a divalent iron compound and an ammonium salt of element (X) are mixed together, and then the thus-obtained mixture is calcined in an inert gas atmosphere or a reducing gas atmosphere. The alkali metal compound used includes, for example, lithium compounds such as $Li_2CO_3$, $LiOH$ and $LiNO_3$, and sodium compounds such as $Na_2CO_3$, $NaOH$ and $NaNO_3$.

As specific examples of the divalent iron compound, there can be mentioned $FeC_2O_4 \cdot 2H_2O$, $Fe(CH_3COO)_2$ and $FeCl_2$. As specific examples of the ammonium salt of element (X), there can be mentioned phosphoric acid salts such as $(NH_4)_2HP_4$, $NH_4H_2P_4$ and $(NH_4)_3P_4$, and sulfuric acid salts such as $NH_{14}HSO_4$ and $(NH_4)_2SO_4$.

Further, an iron compound having a nasicon-type structure may also be used as the iron compound for the positive electrode active material. The iron compound with a nasicon-type structure includes, for example, $Li_2Fe_{2-n}V_n(XO_4)_3$ where $0 \leq n < 2$, preferably $0 \leq n \leq 1$.

The composite of an iron compound with carbon is prepared, for example, by making finely divided carbon particles present in the course of preparing the above-mentioned iron compound. The carbon as herein used refers to allotropes, and, as preferable specific examples thereof, there can be mentioned those which have electrical conductivity such as, for example, acetylene black, ketjen black and graphite.

The average particle diameter of the finely divided carbon particles used are not particularly limited, but is preferably in the range of 5 nm to 100 nm in view of suitability for the preparation of a composite of iron compound therewith. When the average particle diameter is smaller than 5 nm, its reactivity with an iron compound is poor as compared with those having the average particle diameter of 5 to 100 nm. In contrast, when the average particle diameter is larger than 100 nm, the dispersibility becomes poor and the electrical conductivity is enhanced only to a minor extent as compared with those having the average particle diameter of 5 to 100 nm.

The mole ratio of the carbon atom in the finely divided carbon particles to the alkali metal atom in the iron compound, namely, the ratio of the carbon atom to the alkali metal atom, which are contained in the positive electrode active material used in the present invention, is preferably in the range of 0.02 to 0.2 by mole. When the mole ratio is below 0.02, the above-mentioned advantageous effect achieved by the composite of finely divided carbon particles is poor because of small amount of carbon atom as compared with the effect achieved when the mole ratio is within the above range. In contrast, when the mole ratio exceeds 0.2, the reactivity for the producing the positive electrode active material is reduced, and the discharge capacity of a battery is decreased, as compared with the case when the mole ratio is within the above range.

As other methods, for the preparation of the composite of an iron compound with carbon, there can be mentioned a method of thermally decomposing an organic compound or carbon monoxide in the presence of the above-mentioned iron compound, and a method of producing the above-mentioned iron compound in the presence of an organic compound or carbon monoxide wherein a thermal reaction is allowed to occur under reducing conditions.

The organic compound used in these methods includes, for example, hydrocarbons such as pitch, tar, perylene and derivatives thereof; saccharides; and polymers such as polyolefin, phenolic resin, cellulose and cellulose esters.

The positive electrode active material preferably has a particle diameter in the range of 0.1 to 50 μm, more preferably 1 to 20 μm, as expressed by the 50% accumulated mean volume diameter. When the 50% accumulated mean volume diameter is within this range, a resulting secondary battery has enhanced charge-discharge capacities, and the handling at the steps of producing an electrode composition and an electrode is easy. The 50% accumulated mean volume diameter can be determined by measuring the particle distribution by laser diffraction.

The composition for electrode according to the present invention comprises a copolymer (P) prepared by copolymerization of a monomer mixture comprising at least one monomer selected from acrylic acid esters and methacrylic acid esters, and an α,β-unsaturated nitrile compound. By using the copolymer (P) as a binder, an electrode having enhanced binding force, electrical conductivity and flexibility can be obtained.

Among the acrylic acid esters and methacrylic acid esters used in the present invention, alkyl esters are preferable. Acrylic acid alkyl esters are more preferable. Alkyl esters, the alkyl group of which has 1 to 18 carbon atoms, are especially preferable.

As specific examples of the acrylic acid esters, there can be mentioned acrylic acid alkyl esters such as methyl acrylate, ethyl acrylate, propyl acrylate, isopropyl acrylate, n-butyl acrylate, isobutyl acrylate, cyclohexyl acrylate, 2-ethylhexyl acrylate, isopentyl acrylate, isooctyl acrylate, isobonyl acrylate, isodecyl acrylate, lauryl acrylate, stearyl acrylate and tridecyl acrylate; ether group-containing acrylic acid esters such as butoxyethyl acrylate, ethoxydiethylene glycol acrylate, methoxydipropylene glycol acrylate, methoxypolyethylene glycol acrylate, phenoxyethyl acrylate and tetrahydrofurfuryl acrylate; hydroxyl group-containing acrylic acid esters such as 2-hydroxyethyl acrylate, 2-hydroxypropyl acrylate, 2-hydroxy-3-phenoxypropyl acrylate and 2-acryloyloxyethyl-2-hydroxyethylphthalic acid; carboxylic acid-containing acrylic acids such as 2-acryloyloxyethyl phthalate; fluorine-containing acrylic acid esters such as perfluorooctylethyl acrylate; phosphorus-containing acrylic acid esters such as phosphonoethyl acrylate; epoxy group-containing acrylic acid esters such as glycidyl acrylate; and amino group-containing acrylic acid esters such as dimethylaminoethyl acrylate.

As specific examples of the methacrylic acid esters, there can be mentioned methacrylic acid alkyl esters such as methyl methacrylate, ethyl methacrylate, propyl methacrylate, isopropyl methacrylate, n-butyl methacrylate, isobutyl methacrylate, cyclohexyl methacrylate, 2-ethylhexyl methacrylate, isopentyl methacrylate, isooctyl methacrylate, isobonyl methacrylate, isodecyl methacrylate, lauryl methacrylate, tridecyl methacrylate and stearyl methacrylate; ether group-containing methacrylic acid esters such as butoxyethyl methacrylate, ethoxydiethylene glycol methacrylate, methoxydipropylene glycol methacrylate, methoxypolyethylene glycol methacrylate, phenoxyethyl methacrylate and tetrahydrofurfuryl methacrylate; hydroxyl group-containing methacrylic acid esters such as 2-hydroxyethyl methacrylate, 2-hydroxypropyl methacrylate, 2-hydroxy-3-phenoxypropyl methacrylate and 2-methacryloyloxyethyl-2-hydroxyethylphthalic acid; carboxylic acid-containing methacrylic acids such as 2-methacryloyloxyethyl phthalate; fluorine-containing methacrylic acid esters such as perfluorooctylethyl methacrylate; phosphorus-containing methacrylic acid esters such as phosphonoethyl methacrylate; epoxy group-containing methacrylic acid esters such as glycidyl methacrylate; and amino group-containing methacrylic acid esters such as dimethylaminoethyl methacrylate.

These acrylic acid esters and methacrylic acid esters may be used either alone or as a combination of at least two thereof. The content of the acrylic acid esters or methacrylic acid esters in the monomer mixture is usually in the range of 70 to 99% by weight, preferably 75 to 97% by weight and more preferably 80 to 95% by weight.

As the α,β-unsaturated nitrile compound, acrylonitrile and methacrylonitrile are preferably used. The content of the α,β-unsaturated nitrile compound in the monomer mixture is usually in the range of 1 to 30% by weight, preferably 3 to 25% by weight and more preferably 5 to 20% by weight. When the content of the α,β-unsaturated nitrile compound falls in this range, a resultant electrode has excellent binding force and electrical conductivity.

The monomer mixture may further comprise other monomers copolymerizable with the acrylic acid esters or methacrylic acid esters and the α,β-unsaturated nitrile compound. Such copolymerizable monomers include, for example, crotonic acid esters, unsaturated carboxylic acids, and carboxylic acid esters having at least two carbon-carbon double bonds.

As specific examples of the crotonic acid esters, there can be mentioned methyl crotonate, ethyl crotonate, propyl crotonate, butyl crotonate, isobutyl crotonate and 2-ethylhexyl crotonate. The content of the crotonic acid ester in the monomer mixture is preferably not larger than 3% by weight.

As specific examples of the unsaturated carboxylic acids, there can be mentioned acrylic acid, methacrylic acid, crotonic acid, isocrotonic acid, maleic acid, fumaric acid, citraconic acid, mesaconic acid, glutaconic acid and itaconic acid. The content of the unsaturated carboxylic acid in the monomer mixture is preferably in the range of 0.1 to 10% by weight, more preferably 1 to 5% by weight.

As specific examples of the carboxylic acid esters having at least two carbon-carbon double bonds, there can be mentioned ethylene glycol dimethacrylate, diethylene glycol dimethacrylate and trimethylolpropane trimethacrylate. The content of the carboxylic acid esters having at least two carbon-carbon double bonds in the monomer mixture is preferably in the range of 0.1 to 10% by weight, more preferably 1 to 5% by weight.

The monomer mixture may comprise other monomers such as aromatic vinyl compounds such as styrene; conjugated dienes such as 1,3-butadiene and isoprene; and 1-olefins such as ethylene and propylene. The total content of these monomers in the monomer mixture is preferably not larger than 20% by weight, more preferably not larger than 10% by weight. If the content of these monomers is too large, the heat resistance is lowered and a resulting electrode has poor binding force and flexibility.

The procedure for copolymerizing the above-mentioned monomer mixture is not particularly limited, a conventional polymerization procedure may be adopted which includes, for example, an emulsion polymerization procedure, a suspension polymerization procedure, a dispersion polymerization procedure and a solution polymerization procedure. Of these, an emulsion polymerization procedure is preferable because the particle diameter of the copolymer (P) can be easily controlled.

The average particle diameter of the copolymer (P) is usually in the range of 0.01 to 10 μm, preferably 0.05 to 1 μm. When the average particle diameter is too large, the amount of the copolymer (P) used must be increased and thus a resulting battery is liable to have undesirably large internal resistance. In contrast, when the average particle diameter is too small, the copolymer (P) tends to undesirably cover the surface of the positive electrode active material whereby the reaction is inhibited. The average particle diameter as herein used refers to a number average particle diameter which is an arithmetic mean value of particle diameters as measured on 100 copolymer particles, chosen at random, by a transmission electron microscope.

The copolymer (P) has a glass transition temperature (Tg) in the range of −100 to +100° C., preferably −50 to +50° C., and more preferably −40 to +30° C. When the Tg is too high, the flexibility and binding force of an electrode are liable to be reduced and the electrode layer tends to fall off from a collector or broken when it is wound. When the Tg is too low, the binding force of an electrode is liable to be reduced.

The proportion in amounts of the positive electrode active material to the copolymer (P) in the electrode composition of the present invention is such that the copolymer (P) is usually in the range of 0.1 to 30 parts by weight, preferably 0.2 to 20 parts by weight and more preferably 0.5 to 10 parts by weight, based on 100 parts by weight of the positive electrode active material. When the amount of the copolymer (P) falls within this range, a resulting electrode has an enhanced binding force, and a resulting battery has a low internal resistance and a large capacity.

The electrode composition according to the present invention preferably further comprise a solvent. As the solvent, water or an organic solvent is used. The organic solvent is not particularly limited, but those, which have a boiling point at normal pressure in the range of 80° C. to 350° C., are preferably used. More preferably the boiling point is 100° C. to 300° C.

As specific examples of the solvent, there can be mentioned hydrocarbons such as n-dodecane, decahydronaphthalene and tetraline; alcohols such as 2-ethyl-1-hexanol; ketones such as phorone and acetophenone; esters such as benzyl acetate, isopentyl butyrate, γ-butyrolactone, methyl lactate, ethyl lactate and butyl lactate; amines such as toluidine; amides such as N-methyl-2-pyrrolidone (NMP), N,N-dimethylacetamide and N,N-dimethylformamide; and sulfoxides and sulfones, such as dimethyl sulfoxide and sulfolane.

Among the above-recited solvents, water and N-methyl-2-pyrolidone are especially preferable because of good coatability on a collector and enhanced dispersibility of the copolymer (P).

The amount of the solvent used can be appropriately chosen so as to obtain a desired viscosity, depending upon the kinds of positive electrode active material and copolymer (P). More specifically, the concentration of the total solid content including the positive electrode material, the copolymer (P), and the thickener and electrically conducting material, mentioned below, is preferably in the range of 40 to 90% by weight, more preferably 40 to 70% by weight and especially preferably 55 to 65% by weight, based on the electrode composition.

When the concentration of the total solid content is within the above-mentioned range, the uniformity of the electrode composition, the surface smoothness, adhesion and flexibility of a resulting electrode, and characteristics of a resulting battery such as the initial capacity and repeated charge-discharge cycle characteristics are highly balanced.

The composition for electrode of the present invention preferably further comprise a thickener in addition to the solvent. By the incorporation of a thickener, the coatability of the composition for electrode can be more enhanced and the fluidity can be given to a desired extent.

The thickener includes a polymer soluble in the solvent, and, in the case when water is used as the solvent, water-soluble polymers are used as the thickener. As specific examples of the water-soluble polymers, there can be mentioned cellulosic polymers such as carboxymethylcellulose, methylcelluose and hydroxypropylcellulose, and their ammonium salts and alkali metal salts; polyacrylic acid and polymethacrylic acid, and their ammonium salts and alkali metal salts; and vinyl alcohol polymers such as polyvinyl alcohol, an acrylic acid-vinyl alcohol copolymer and an acrylic acid salt-vinyl alcohol copolymer.

In the case when an organic solvent is used as the thickener, polyacrylonitrile and a hydrogenated acrylonitrile-butadiene rubber can be mentioned as specific examples of the thickener.

The amount of these thickeners is in the range of 0.1 to 10 parts by weight, preferably 0.5 to 5 parts by weight, based on 100 parts by weight of the positive electrode active material.

The composition for electrode according to the present invention may comprise other polymers in addition to the copolymer (P) and the thickener. Such optional polymers include, for example, fluororesins such as polytetrafluoroethylene and polyvinylidene fluoride; and diene rubbers such as styrene-butadiene rubber and acrylonitrile-butadiene rubber and their modified products and hydrogenated products.

The composition for electrode according to the present invention may further comprise an electrically conductive material, which includes, for example, carbon black such as furnace black, acetylene black and ketjen black; and graphite such as natural graphite and artificial graphite. The electrically conductive materials may be the same as or different from the carbon material incorporated in the positive electrode active material. Of these, carbon black is preferable. Acetylene black and furnace black are especially preferable.

The electrically conductive material usually has an average particle diameter of smaller than that of the positive electrode material. The particle diameter of the electrically conductive material is usually in the range of 0.01 to 10 μm, preferably 0.5 to 5 μm and more preferably 0.1 to 1 μm, as the weight average particle diameter. These electrically conductive materials may be used either alone or as a combination of at least two thereof. The amount of the electrically conductive material is usually in the range of 1 to 30 parts by weight, preferably 2 to 20 parts by weight, based on 100 parts by weight of the positive electrode active material.

The composition for electrode according to the present invention can be prepared by mixing together the above-mentioned positive electrode active material, the copolymer (P), and the optional thickener, electrically conductive material and solvent. Preferably these ingredients are mixed together by using a mixer to form a slurry having a solid content of 40 to 90% by weight. The mixing can be carried out by charging a vessel with the respective ingredients at once, and then, mixing the content to form a dispersion. However, in a more preferable method, the optional electrically conductive material and thickener are mixed together in a solvent to form a fine particle dispersion, and then, a liquid dispersion of the positive electrode active material and the copolymer (P) in a solvent is added to the fine particle dispersion, and the resultant mixture is uniformly stirred to form a slurry.

The mixer used is not particularly limited, but usually, there can be mentioned dispersion mixers such as a media-mill, a homogenizer and an ultrasonic dispersion mixer; and mixing kneaders such as a kneader, a roll mill, a double planetary mixer and a stirring mashing machine. Of these, dispersion mixers are preferable. A media-mill is especially preferable because uniformity of the composition for electrode, surface smoothness, adhesion and softness of a resulting electrode, and characteristics such as initial capacity and repeated charge-discharge cycle characteristic of a resulting battery are improved to a great extent. A media-mill refers to a dispersion mixer having a function of rapidly revolving media charged in a vessel whereby a powdery material is uniformly dispersed in a liquid, and, as specific examples thereof, there can be mentioned a ball mill, an attritor, a bead mill, a sand mill and a pigment dispersion mixer.

The mixing conditions are chosen depending upon the mixing ingredients and the mixer used. The mixing temperature is usually in the range of −50 to 100° C., preferably 0 to 80° C., and more preferably, room temperature to 50° C. The mixing time is usually in the range of 10 minutes to 10 hours, preferably 30 minutes to 5 hours, and more preferably 1 to 3 hours. The number of revolution of the mixer is appropriately chosen depending upon the other mixing conditions, but is usually in the range of 50 to 5,000 cycles/min, preferably 100 to 3,000 cycles/min, and more preferably 500 to 2,000 cycles/min.

No limitation is imposed to a method of dispersing the positive electrode active material and the copolymer (P) in a solvent to prepare a liquid dispersion. In the case when water is used as the solvent, a preferable example of the dispersing method is a method wherein a copolymer (P) is made by an emulsion polymerization procedure to prepare an aqueous latex. In the case when an organic solvent is used as the solvent, a preferable example of the dispersing method is a procedure of substituting water in the resulting aqueous latex by an organic solvent. To the thus-prepared aqueous latex or the latex containing the organic solvent in substitution for water, the positive electrode active material is added and mixed together to give a liquid dispersion. The procedure of substituting water in the aqueous latex by an organic solvent includes, for example, a procedure wherein an organic solvent is added in the aqueous latex, and then water is removed, for example, by distillation or dispersion medium phase reversal.

The electrode according to the present invention is comprised of the active material layer comprising (i) the above-mentioned positive electrode active material and (ii) the copolymer (P), and a collector. The collector is composed of an electrically conductive material, which usually includes metallic electrically conductive materials such as iron, copper, aluminum, nickel and stainless steel. Of these, aluminum is preferable. The shape of collector is not particularly limited, but a sheet-form collector having a thickness of 0.001 to 0.5 mm is preferable.

The method of forming the active material layer is not particularly limited. For example, a method of extruding or press-forming the composition for electrode of the present invention into a sheet form can be adopted. However, a more preferable method is a method of coating a collector with a solvent-containing electrode composition according to the present invention, and then removing the solvent from the thus-formed coating.

The coating of a collector with the solvent-containing electrode composition can be carried out by a doctor blade method, a dipping method, a reverse roll method, a direct roll method, a gravure method, an extrusion method or a brushing method. The amount of the solvent-containing electrode composition to be coated is not particularly limited, but is chosen so that an active material layer usually having a thickness in the range of 0.005 to 5 mm, preferably 0.01 to 2 mm, as the dry material layer, is formed after drying of the coating.

The method of removing the solvent from the coating includes, for example, air stream drying using warm air, hot air or low humidity air, vacuum drying, and irradiation with infrared rays or far-infrared rays or electron rays. The drying temperature is usually in the range of 50 to 250° C., preferably 60 to 200° C. The collector having the active material layer as formed by drying may be pressed to stabilize the thus-formed electrode. The pressing can be carried out by using, for example, a mold press or a roll press.

The battery according to the present invention is provided with the above-mentioned electrode of the present invention. The battery of the present invention is usually made by using the electrode of the present invention as a positive electrode in combination with conventional parts such as a negative electrode, an electrolyte and a separator. More specifically, a negative electrode and a positive electrode (i.e., the electrode of the present invention) are superposed with an intervening separator, the thus-obtained assembly is wound or folded according to the shape of battery, the wound or folded assembly is inserted in a battery vessel, an electrolytic solution is filled in the battery vessel, and then, the vessel is sealed. According to the need, an expand metal, and overcurrent devices such as PTC element and huse, and a lead wire are assembled in the vessel whereby undesirable pressure increase in the battery vessel can be avoided, and overcharge and overdischarge can be prevented. The shape of battery may be any of coin-shape, button-shape, sheet-shape, cylindrical shape, rectangular shape, and flat-shape.

The negative electrode of the battery according to the present invention may be conventional negative electrode. As specific examples of a negative electrode active material, there can be mentioned metallic lithium, lithium alloy, lithium compounds, and other conventional alkali metals such as metallic sodium, alkaline earth metals such as magnesium, and substances capable of storing or releasing an alkali metal ion or an alkaline earth metal, such as, for example, alloys of the above-mentioned metals and carbon materials. Of these, carbon materials are preferable. As a collector for the negative electrode, those which are recited for a collector for the positive electrode can be used. A copper foil is especially preferable as the collector for negative electrode.

The electrolytic solution may be liquid or gel-like, provided that it is used for conventional batteries. The electrolytic solution may be appropriately chosen depending upon the negative electrode active material and the positive electrode active material so as to obtain a desired battery performance.

The electrolyte used includes conventional lithium salts, and, as specific examples thereof, there can be mentioned $LiClO_4$, $LiBF_4$, $LiPF_6$, $LiCF_3CO_2$, $LiAsF_6$, $LiSbF_6$, $LiB_{10}Cl_{10}$, $LiAlC_4$, $LiCl$, $LiBr$, $LiB(C_2H_5)_4$, $LiCF_3SO_3$, $LiCH_3SO_3$, $LiC_4F_9S_3$, $Li(CF_3SO_2)_2N$, and lower fatty acid lithium salt.

The liquid medium in which the electrolyte is dissolved (i.e., liquid medium for electrolyte) is not particularly limited. As specific examples of the liquid medium for electrolyte, there can be mentioned carbonates such as propylene carbonate, ethylene carbonate, butylene carbonate, dimethyl carbonate, ethyl methyl carbonate and diethyl carbonate; lactones such as γ-butyrolactone; ethers such as trimethoxyethane, 1,2-dimethoxyethane, diethyl ether, 2-ethoxyethane, tetrahydrofuran and 2-methyltetrahydrofuran; and sulfoxides such as dimethyl sulfoxide. Of these, carbonates are preferable because of high chemical, electrochemical and thermal stabilities. These liquid media for electrolyte may be used either alone or as a combination of at least two thereof.

Separator, battery vessel and other battery parts may be chosen from conventional battery parts.

EXAMPLES

The invention will now be described more specifically by the following examples and comparative examples that by no means limit the scope of the invention. Parts and % in the examples and comparative examples are by weight unless otherwise specified.

Characteristics of slurry of electrode compositions, electrodes and batteries were determined by the following methods.

(1) Solid Content in Slurry

About 1 g of slurry was precisely weighed on an aluminum dish having a 5 cm diameter, and then, dried in an oven at 120° C. for 1 hour. The solid content in slurry was calculated from the weight of slurry as measured before drying, and the weight of dried slurry as measured after drying.

Solid content in slurry of electrode composition (%)=
[(weight of dried slurry plus dish–tare weight of aluminum dish)÷(weight of slurry plus dish as measured before drying–tare weight of aluminum dish)]×100

(2) Smoothness (Surface Roughness)

Using an electrode before the roll pressing, arithmetic mean roughness (Ra) was measured on an area of 20 µm square on the surface of the active material layer of the electrode by an atomic force microscope according to JIS B0601. The larger the Ra, the poorer the smoothness.

(3) Peel Strength

An electrode was cut into a square specimen having 2.5 cm width×10 cm length. The specimen was fixed so that the active material layer was upward. Self-adhesive Cellophane tape was adhered on the active material layer surface of specimen, and the stress at peeling was measured when the adhered tape was pulled from one end of the specimen at a peel angle of 180° at a rate of 50 mm/min whereby the active material layer was peeled from the collector. The measurement of stress was conducted 10 times and the peel strength was expressed by the mean value. The larger the peel strength, the larger the adhesion between the active material layer and the collector.

(4) Flexibility of Electrode

An electrode was cut into a square specimen having 3 cm width×9 cm length. The specimen was placed on a desk so that the active material layer side of the specimen was downward. A stainless steel rod having a 1 mm diameter was placed on the center of the collector side of the specimen, i.e., at a location of 4.5 cm apart from both ends of the specimen, so that the rod was perpendicular to the lengthwise direction. The specimen was folded in half along the rod at an angle of 180° so that the active material layer forms the exposed outsides. Crack formation and separation at the folded portion were observed. This test was carried out on ten specimens. The evaluation results were expressed according to the following four ratings.

A: Neither crack formation nor separation was observed on the ten specimens.

B: Crack formation or separation was observed on one to three specimens among the 10 specimens.

C: Crack formation or separation was observed on four to nine specimens among the ten specimens.

D: Crack formation or separation was observed on all of the ten specimens.

(5) Battery Capacity and Charge-Discharge Cycle Characteristics

Using the coin-shaped batteries made in examples and comparative examples, a charge-discharge test was carried out while a cycle of charge and discharge was repeated between 2.5 V and 4.0 V at a temperature of 23° C. and a constant current rate of 0.1 C. Discharge capacity was measured at the 10th cycle and the 100th cycle. The battery capacity was expressed by the discharge capacity as measured at the 10th cycle. The unit of capacity is mAh/g of active material. The charge-discharge cycle characteristics were expressed by the ratio in % of the discharge capacity as measured at the 100th cycle to the discharge capacity as measured at the 10th cycle. The larger the capacity ratio, the smaller the reduction in capacity by the repeated charge-discharge cycle.

(6) Charge-Discharge Rate Characteristics

A charge-discharge test was carried by the same procedures as described above for the determination of (5) charge-discharge cycle characteristics, except that the constant current rate was changed to 1.5 C with the other conditions remaining the same. The measurement of discharge capacity was conducted at the 10th cycle. The charge-discharge rate characteristics were expressed by the ratio in % of the discharge capacity at the 10th cycle to the battery capacity as mentioned above for the determination of (5) charge-discharge cycle characteristics. With an increase of this discharge capacity ratio, the internal resistance becomes small and the charge-discharge can be conducted at a high rate.

(7) Characteristics at Overcharge

A charge-discharge test was carried by the same procedures as described above for the determination of (5) battery capacity, except that the cycle of charge and discharge was repeated between 2.5 V and 4.2 V with the other conditions remaining the same. The measurement of discharge capacity was conducted at the 10th cycle. The characteristics at overcharge were expressed by the ratio in % of the discharge capacity at the 10th cycle to the battery capacity as mentioned above for the determination of (5) battery capacity. With an increase of this discharge capacity ratio, the battery performance can be retained even at overcharge and the safety is high.

Example 1

A reactor equipped with a stirrer and a condenser was charged with 674.9 parts of deionized water, 7.1 parts of an aqueous 28% sodium laurylsulfate solution and 0.8 part of sodium tripolyphosphate in a nitrogen gas atmosphere. The content was heated to 75° C. while being stirred. Then, 82 parts of an aqueous 2.44% ammonium persulfate solution as an aqueous initiator solution was added to the content. Subsequently, 400 parts of a monomer mixture having a composition shown in Table 1 was added to the content at a constant rate over a period of 2 hours. After completion of the addition, the mixture was maintained at a reaction temperature of 80° C. for 3 hours to give a copolymer latex. The polymerization conversion was 99%. The composition of the copolymer was the same as the composition of the monomer mixture. Aqueous ammonia was added to the copolymer latex to give a pH value of 7. Then the copolymer latex was concentrated under reduced pressure to remove the residual monomer, thereby giving a latex with a solid content of 40%.

As a positive electrode active material, $LiFePO_4$ with an olivine structure having a 50% accumulated mean volume diameter of 2.9 µm and having 1.6% of carbon incorporated therein was produced by the method described in Japanese Unexamined Patent Publication No. 2003-36889. More specifically, $LiH_2PO_4$, $FeC_2O_4.2H_2O$ and acetylene black were mixed together by a stirring mashing machine at a proportion of Li:Fe:C=1:1:0.4 by mole. The thus-obtained mixture was calcined at 650° C. for 6 hours in an argon gas stream, and then, pulverized to give the above-mentioned positive electrode active material.

7.5 parts of the above-mentioned copolymer latex (comprising 3 parts of the copolymer and 4.5 parts of water), 75 parts of an aqueous 2% carboxymethylcellulose ("Cellogen WSC" available from Dai-ichi Kogyo Seiyaku Co., Ltd.) solution as a thickener, 100 parts of the above-mentioned positive electrode active material, 10 parts of acetylene black as an electrically conductive material, and water (in an amount of giving a solid content of 60%) were mixed together at room temperature at a revolution number of 750 cycles/min for 45 minutes by using a bead mill, to give an electrode composition slurry.

An aluminum foil having a thickness of 20 μm was coated uniformly with the electrode composition slurry by a doctor blade method. The thus-formed coating was dried at 120° C. for 15 minutes. The surface roughness (Ra) of the thus-obtained electrode was measured. The results are shown in Table 1. The electrode was pressed by a twin roll press, and then dried at 250° C. under a reduced pressure of 0.6 kPa for 10 hours in a vacuum drier to give a positive electrode having an active material layer with a thickness of 110 μm. The peel strength and the flexibility of the pressed positive electrode were measured. The results are shown in Table 1.

The positive electrode was cut into a circular shape having a diameter of 15 mm. A separator, as a negative electrode composed of metallic lithium, and an expanded metal part were superposed in this order on the active material layer side of the positive electrode to form a multilayer assembly. The separator had a circular shape having a diameter of 18 mm and a thickness of 25 μm, and was made from a porous polypropylene membrane. The multilayer assembly was inserted in a coin-shaped outer vessel made of a stainless steel sheet having a thickness of 0.25 mm and provided with a polypropylene packing and having a diameter of 20 mm and a height of 1.8 mm. An electrolyte solution was injected into the vessel so that no air remains within the vessel. A stainless steel cap having a thickness of 0.2 mm was placed on the thus-inserted multilayer assembly via a polypropylene packing. The stainless steel cap was fixed, and the battery vessel was sealed whereby a coin-shaped battery having a diameter of 20 mm and a thickness of about 2 mm was made. The electrolyte solution used was a solution of $LiPF_6$ with a concentration of 1 mole/liter in a mixed liquid composed of ethylene carbonate (EC) and diethyl carbonate (DEC) at an EC/DEC ratio of 1/2 by volume at 20° C. Characteristics of the coin-shaped battery were evaluated. The results are shown in Table 1.

In Table 1, the abbreviations for monomers are as follows.
2EHA 2-Ethylhexyl acrylate
BA Butyl acrylate
AN Acrylonitrile
EDMA Ethylene glycol dimethacrylate
BD 1,3-Butadiene
ST Styrene Example 2, Comparative Examples 1 and 2

By the same procedures as described in Example 1, copolymer latexes, electrodes and batteries were made, except that the monomer mixtures shown in Table 1 were used. The characteristics of the electrodes and the batteries were evaluated. The results are shown in Table 1.

Comparative Example 3

By the same procedures as described in Example 1, a copolymer latex having a solid content of 40% was made except that the monomer mixture shown in Table 1 was used. Then, 7.5 parts (3 parts as the solid content) of the copolymer latex was mixed together with 75 parts of an aqueous 2% ammonium polyacrylate, 100 parts of the same positive electrode active material as used in Example 1, 10 parts of acetylene black as an electrically conductive material, and water, by a bead mill, to give an electrode composition.

Using the thus-obtained electrode composition, an electrode and a battery were made by the same procedures as described in Example 1. The characteristics of the electrode and the battery were evaluated. The results are shown in Table 1.

Example 3

By the same procedures as described in Example 1, a copolymer latex having a solid content of 40% was made except that a monomer mixture comprising 296 parts of 2-ethylhexyl acrylate (2EHA), 80 parts of butyl acrylate (BA) and 4 parts of ethylene glycol dimethacrylate (EDMA) was used. Then, as a positive electrode active material, $LiFePO_4$ with an olivine structure having a 50% accumulated mean volume diameter of 2.9 μm and having 1.6% of carbon incorporated therein was produced by the same procedures as described in Example 1.

TABLE 1

|  |  | Example | | Comparative Example | | |
|---|---|---|---|---|---|---|
| Composition of monomer mixture *1 |  | 1 | 2 | 1 | 2 | 3 |
| Surface roughness | (μm) | 0.76 | 0.79 | 0.80 | 0.76 | 0.81 |
| Peel strength | (N/cm) | 0.41 | 0.65 | 0.20 | 0.14 | 0.1 |
| Flexibility |  | A | B | A | D | D |
| Battery capacity | (mAh/g) | 158 | 157 | 150 | 146 | 143 |
| Charge-discharge cycle characteristics | (%) | 92 | 87 | 60 | 57 | 55 |
| Charge-discharge rate characteristics | (%) | 80 | 78 | 62 | 57 | 53 |
| Characteristics at overcharge | (%) | 103 | 101 | 100 | 57 | 32 |

Note
*1 Composition of monomer mixture
(numerals within parentheses refer to amount in % by weight)
Example 1 2EHA(74)/BA(20)/AN(5)/EDMA(1)
Example 2 2EHA(64)/BA(20)/AN(15)/EDMA(1)
Com. Ex. 1 2EHA(64)/BA(35)/EDMA(1)
Com. Ex. 2 AN(50)/BD(50)
Com. Ex. 3 ST(50)/BD(50)

Using the thus-produced positive electrode active material and the above-mentioned copolymer latex, an electrode having an active material layer with a thickness of 120 μm was made by the same procedures as described in Example 1. The surface roughness (Ra) of the electrode was measured. The result is shown in Table 2.

Then, following the same procedures as described in Example 1, the electrode was pressed and dried under reduced pressure to a positive electrode having an active material layer with a thickness of 100 μm. The peel strength and the flexibility of the pressed positive electrode were evaluated. The results are shown in Table 2.

Using the pressed positive electrode, a battery was made by the same procedures as described in Example 1. The characteristics of the battery were evaluated. The results are shown in Table 2.

TABLE 2

|  |  | Example |  |  |  |  |
|---|---|---|---|---|---|---|
|  |  | 3 | 4 | 5 | 6 | 7 |
| Solid content | (wt. %) | 70 | 65 | 60 | 55 | 40 |
| Mixer *1 |  | BM | BM | BM | BM | BM |
| Surface roughness | (μm) | 1.35 | 0.93 | 0.76 | 0.88 | 1.23 |
| Peel strength | (N/cm) | 0.30 | 0.35 | 0.41 | 0.37 | 0.25 |
| Flexibility |  | A | A | B | A | A |
| Battery capacity | (mAh/g) | 152 | 155 | 159 | 155 | 150 |
| Charge-discharge cycle characteristics | (%) | 88 | 91 | 93 | 90 | 84 |
| Charge-discharge rate characteristics | (%) | 82 | 84 | 80 | 83 | 85 |
| Characteristics at overcharge | (%) | 101 | 102 | 103 | 101 | 101 |

*1 BM refers to bead mill

Examples 4 to 7

By the same procedures as described in Example 3, electrodes and batteries were made wherein the solid contents in the electrode composition slurries were changed as shown in Table 2 and the mixing time was changed to 1.5 hours with all other conditions remaining the same. The solid contents, and the characteristics of the electrodes and the batteries are shown in Table 2.

Comparative Example 4

100 parts of the same positive electrode active material as obtained in Example 3, 10 parts of acetylene black as an electrically conductive material, the same styrene-butadiene copolymer latex (solid content: 2 parts), and 1 part (as solid content) of ammonium polyacrylate as a thickener were put into a planetary mixer, and the agitating blades of planetary mixer were rotated at 100 rpm on their axes and revolved at 50 rpm, for 3 hours. The thus-obtained mixture was dispersed in N-methyl-2-pyrrolidone to give an electrode composition slurry.

By the same procedures as described in Example 3, an electrode and a battery were made wherein the above-mentioned electrode composition slurry was used with all other conditions remaining the same. The characteristics of the electrode and the battery were evaluated. The electrode active material layer had a surface roughness of 2.10 μm and a peel strength of 0.10 N/cm. The electrode had a flexibility of D. The battery exhibited a capacity of 65 mAh/g and charge-discharge cycle characteristics of 45%.

As seen from the above-mentioned examples and comparative examples, the electrode made from the composition for electrode according to the present invention has high binding force and good flexibility. This electrode can give a battery having a high capacity and good repeated charge-discharge cycle characteristics, and having a low internal resistance and being capable of being rapidly charged and discharged and further having enhanced safety. Especially the electrode as made by using a bead mill as a mixer is characterized in that its electrode active layer has a good surface smoothness and enhanced adhesion between the active material layer and the collector, and has good flexibility, and gives a battery having greatly improved characteristics, as compared with the electrode as made by using other mixers.

INDUSTRIAL APPLICABILITY

The electrode made from the composition for electrode according to the present invention has high binding force and good flexibility. Therefore, this electrode can give a battery having a high capacity and good charge-discharge cycle characteristics, and having a low internal resistance and being capable of being rapidly charged and discharged and further having enhanced safety.

The battery according to the present invention is useful, for example, as a small-size battery for electric source of portable electronic appliances, and as a large-size battery for electric source of electric vehicles. The battery is especially suitable for a large-size battery because it has a high capacity, exhibits a minimized reduction of capacity at repeated charge-discharge cycle, and has enhanced safety.

The invention claimed is:

1. A slurry composition for electrode comprising:
   (i) a positive electrode active material comprising a composite of an iron compound with carbon, wherein said iron compound is an alkali-metal-containing iron composite oxide (B) represented by the following general formula:

   $A_yFeXO_4$ where A is an alkali metal, X is at least one element selected from the elements of groups 4 to 7 and groups 14 to 17 of the Periodic Table, and y is a number of 0<y<2,
   (ii) a copolymer (P) prepared by copolymerization of a monomer mixture comprising at least one monomer selected from acrylic acid esters and methacrylic acid esters, and an α,β-unsaturated nitrile compound, and
   (iii) water as a solvent,
   wherein the slurry composition has a total solid content of 40 to 70% by weight.

2. The composition for electrode according to claim 1, wherein the alkali metal-containing iron composite oxide (B) has an olivine structure with a close-packed hexagonal oxygen lattice.

3. The composition for electrode according to claim 1, which further comprises (iv) a thickener.

4. The composition for electrode according to claim 1, wherein the monomer mixture comprises at least one monomer selected from acrylic acid esters and methacrylic acid esters in the range of 70 to 99% by weight, and an $\alpha,\beta$-unsaturated nitrile compound in the range of 1 to 30% by weight.

5. The composition for electrode according to claim 4, wherein the monomer mixture further comprises a carboxylic acid ester having at least two carbon-carbon double bonds in the range of 0.1 to 10% by weight.

6. The composition for electrode according to claim 1, wherein the copolymer (P) is contained in the range of 0.1 to 30 parts by weight based on 100 parts by weight of the positive electrode active material.

7. The composition for electrode according to claim 3, wherein the thickener is contained in the range of 0.1 to 10 parts by weight based on 100 parts by weight of the positive electrode active material.

8. The composition for electrode according to claim 1, wherein the composition further comprises an electrically conductive material.

9. The composition for electrode according to claim 8, wherein the electrically conductive material is contained in the range of 1 to 30 parts by weight based on 100 parts by weight of the positive electrode active material.

10. The composition for electrode according to claim 8, wherein the slurry composition has a total solid content of 55 to 65% by weight.

11. The composition for electrode according to claim 8, wherein A represents lithium and X represents at least one element selected from vanadium, phosphorus, arsenic, antimony and bismuth.

12. The composition for electrode according to claim 1, wherein the ratio of the carbon atom to the alkali metal atom in the alkali-metal-containing iron composite oxide (B) is in the range of 0.02 to 0.2 by mole.

13. The composition for electrode according to claim 1, wherein the monomer mixture comprises at least one acrylic acid ester in the range of 75 to 97% by weight, and an $\alpha,\beta$-unsaturated nitrile compound in the range of 3 to 25% by weight.

* * * * *